United States Patent [19]

Busey

[11] 4,400,889
[45] Aug. 30, 1983

[54] QUICK-CLAMP GAUGE FOR MONITORING PIPE BENDING

[76] Inventor: Gerald T. Busey, 913 W. Chambers, Jacksonville, Ill. 62650

[21] Appl. No.: 53,189

[22] Filed: Jun. 29, 1979

[51] Int. Cl.³ .............................................. G01C 9/12
[52] U.S. Cl. ...................................................... 33/372
[58] Field of Search ................................. 33/370–372, 33/399; 81/380, 426

[56] References Cited

U.S. PATENT DOCUMENTS

| | | | |
|---|---|---|---|
| 591,720 | 10/1897 | Armstrong | 81/426 |
| 1,969,052 | 8/1934 | West | 33/372 X |
| 2,438,229 | 3/1948 | Price | 33/399 X |
| 3,330,045 | 7/1967 | Selleck | 33/371 |

*Primary Examiner*—Charles E. Phillips
*Attorney, Agent, or Firm*—Ralph F. Staubly

[57] ABSTRACT

A dial-type clinometer is fixed to a vise-type pliers-like clamp to position its indicator for swinging in a vertical plane which is substantially perpendicular to the pivot of, and which substantially symmetrically bisects, the clamp. At least one of the jaws of the clamp is adapted for insertion into the end of a pipe that is held horizontally in a pipe-bender preparatory to bending of the pipe in a vertical plane. The clamp is so positioned that when the jaws are locked closed upon the pipe wall, the dial of the clinometer will lie in a vertical plane close to the axis of the pipe. After the dial is set to zero, the pipe is bent until the dial index shows the number of degrees of bend desired. The clamp also has a second pair of jaws extending parallel to its pivot for fastening the clinometer with its axis parallel to the axis of the pipe before its removal from the bender, so that the pipe can be removed and replaced in the bender (rotated 180°) for producing sequential off-set bends in the same plane.

5 Claims, 4 Drawing Figures

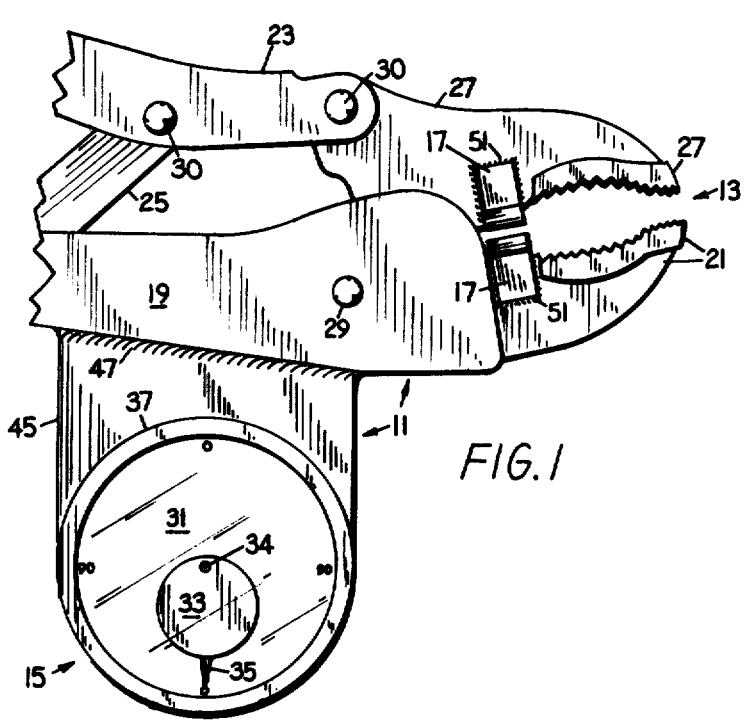
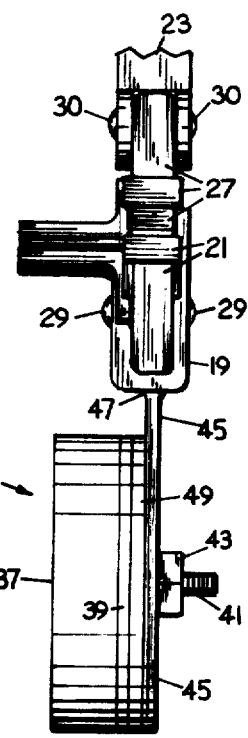
FIG. 1
FIG. 2
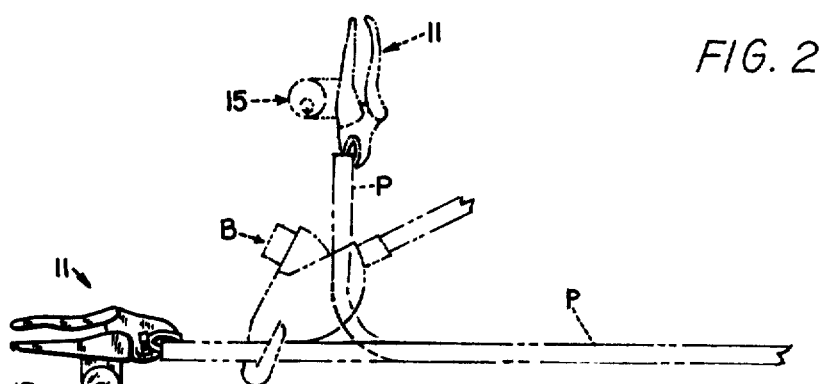
FIG. 3
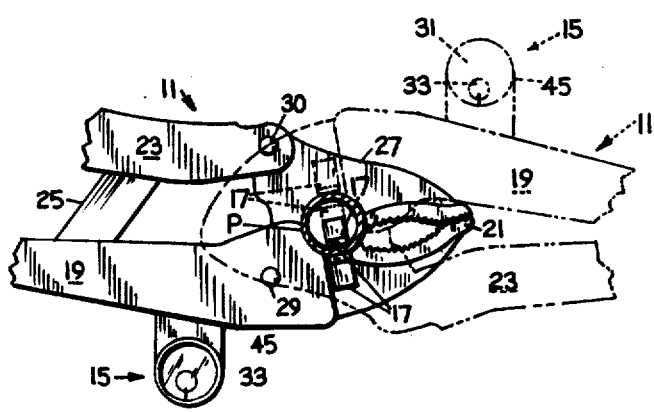
FIG. 4

QUICK-CLAMP GAUGE FOR MONITORING PIPE BENDING

BACKGROUND AND OBJECTS OF THE INVENTION

It is known to provide a spirit-level-type clinometer which is clampable to the side of a pipe for gauging bending or rotation of the pipe, e.g. U.S. patent to Traupmann No. 2,824,381. Said patent discloses a clamp comprising a V-shaped seat, and a co-operating hook pulled toward the seat by a hand-wheel threadedly engaged with the shank of the hook. It is accordingly the principal object of this invention to provide a pipe-bend-gauging dial-type clinometer which can be (one-handedly) very quickly and easily and securely clamped axially or transaxially to the rim of a pipe end. Other objects and advantages will become apparent as the following detailed description proceeds.

BRIEF DESCRIPTION OF THE DRAWING FIGURES

FIG. 1 is a fragmentary side elevational view of the herein modified jaw end of a vice-type pliers of the kind disclosed in U.S. Pat. No. 1,489,458.

FIG. 2 is a front-end view of the FIG. 1 disclosure.

FIG. 3 is a side elevational view showing a pipe-bending operation using the device of FIG. 1.

FIG. 4 is a side elevational view illustrating use of the auxiliary jaws in gauging axial pipe rotation.

DETAILED DESCRIPTION

With reference now to the drawings, the numeral 11 generally designates a preferred embodiment of the invention, which comprises basically a vise-type pliers-like clamp 13 of known construction and operation, a dial-type clinometer unit 15, and a pair of auxiliary jaws 17.

The clamp 13 comprises a lower handle member 19 (to which is immovably fixed a lower jaw 21) and an upper handle member 23. The handle member 23 and a link 25 swing the upper jaw 27 about a pivot pin 29. Pivot pins 30 connect the handle member 23 to the link 25 and the jaw 27.

The clinometer unit 15 is a commercially available instrument having a dial 31 graduated in degrees, a pendulum 33, a pointer 35, and a lens-covered case 37. The clinometer unit 15 is attached to a base plate 39 (FIG. 2) which has fixed thereto an axially extending screw 41. The screw 41 and a nut 43 fasten the clinometer unit 15 to a support plate 45 which depends from and is welded at 47 to the handle member 19. A resilient wafer 49 frictionally holds the unit 15 in adjusted positions.

The auxiliary jaws 17 are formed by L-shaped elements the bases of which are welded at 51 to the side surfaces of the jaws 21 and 27.

MODES OF OPERATION

FIG. 3 shows how the gauge 11 is clamped to the end of a pipe P held in a pipe bender B shown in phantom. The later-bent pipe-end and the gauge 11 (but not the bender) are also shown in phantom in their final pipe-bending positions.

FIG. 4 illustrates the employment of the clinometer 11 in axially rotating and accurately re-positioning a pipe in a bender by use of the auxiliary jaws 17 for making a second bend in the same plane. The phantom-shown rotated position of the device 11 is 180° from the full-line position.

The invention having been described, what is claimed is:

1. A pipe-bend gauge for monitoring the bending of a pipe in a fixed-plane pipe-bender, comprising: a clamp having a pair of pivotally connected jaws, adjustable dead-center means for quickly closing and securely holding said jaws in clamping engagement with the rim of a pipe end with one jaw longitudinally disposed within said pipe, and an adjustable clinometer unit fixed to said clamp with its tilt-indicating axis substantially parallel to the axis of the pivot of said pair of jaws, said clinometer unit having a degree-graduated flat dial adjustably rotatable about a horizontal axis and having a pendulum-type indicator connected to said dial for swinging about said horizontal axis, each of said pair of jaws having an auxiliary jaw extending therefrom and substantially parallel to the pivot axis of said pair of jaws whereby said gauge can be connected to said pipe with its dial lying substantially in a plane either parallel to or perpendicular to the axis of said pipe.

2. A gauge according to claim 1 wherein said auxiliary jaws have substantially parallel clamping faces lying close to the clamping plane of said pair of jaws, whereby a dead-center clamping adjustment will serve for either gauge orientation for a given pipe.

3. A gauge according to claim 2 wherein said auxiliary jaws have their bases welded to the side faces of said pair of jaws.

4. A gauge according to claim 1 wherein each of said pair of jaws has an auxiliary jaw extending laterally thereof for gripping the rim of said pipe to dispose said gauge transversely of the axis of said pipe instead of generally longitudinally thereof.

5. A gauge according to claim 4 wherein said auxiliary jaws have their bases welded to the side surfaces of said pair of jaws.

* * * * *